(12) United States Patent
Tahara et al.

(10) Patent No.: US 9,352,686 B2
(45) Date of Patent: May 31, 2016

(54) VEHICULAR INTERIOR PART

(71) Applicant: TOYOTA BOSHOKU KABUSHIKI KAISHA, Aichi-ken (JP)

(72) Inventors: Hiroyasu Tahara, Nisshin (JP); Yuuki Setoyama, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 57 days.

(21) Appl. No.: 14/491,220

(22) Filed: Sep. 19, 2014

(65) Prior Publication Data

US 2015/0085509 A1 Mar. 26, 2015

(30) Foreign Application Priority Data

Sep. 25, 2013 (JP) ................................. 2013-198423

(51) Int. Cl.
  *B60Q 3/00* (2006.01)
  *B60Q 3/02* (2006.01)
(52) U.S. Cl.
  CPC ............... *B60Q 3/002* (2013.01); *B60Q 3/004* (2013.01); *B60Q 3/0203* (2013.01); *B60Q 3/0216* (2013.01)
(58) Field of Classification Search
  CPC .... B60Q 3/002; B60Q 3/0203; B60Q 3/0216; B60Q 3/004
  USPC .......................................... 362/511, 501, 488
  See application file for complete search history.

(56) References Cited

U.S. PATENT DOCUMENTS

| | | | | |
|---|---|---|---|---|
| 4,788,630 A | * | 11/1988 | Gavagan | B60Q 3/0216 362/501 |
| 7,210,829 B2 | * | 5/2007 | Okazaki | B60Q 3/042 362/23.19 |
| 8,075,173 B2 | * | 12/2011 | Shallcross | B60Q 3/004 296/146.7 |
| 8,356,921 B2 | | 1/2013 | Fujita | |
| 2005/0219854 A1 | * | 10/2005 | Grady | B60Q 1/2669 362/490 |
| 2009/0196058 A1 | * | 8/2009 | Ishida | B60Q 3/004 362/488 |
| 2010/0080010 A1 | * | 4/2010 | Marui | B60Q 3/005 362/488 |
| 2010/0277946 A1 | * | 11/2010 | Shallcross | B60Q 3/004 362/581 |
| 2011/0170304 A1 | | 7/2011 | Fujita | |
| 2013/0094233 A1 | * | 4/2013 | Ukai | B60Q 3/004 362/511 |
| 2014/0226353 A1 | * | 8/2014 | Sohizad | G02B 6/001 362/511 |

FOREIGN PATENT DOCUMENTS

JP 2010-070116 4/2010

* cited by examiner

*Primary Examiner* — Laura Tso
(74) *Attorney, Agent, or Firm* — Greenblum & Bernstein, P.L.C.

(57) ABSTRACT

A vehicular interior part includes an interior part main body, an elongated light guide member guiding light from a light source, and a light guide member holder mounted to the interior part main body and holding the light guide member. The light guide member holder includes an elongated holder main body including a holder recess where the light guide member is arranged and having a U-shaped cross section and extending in an elongated direction of the light guide member, and at least two mount portions provided on a peripheral end portion of the holder main body and arranged along an elongated direction of the holder main body and mounted to the interior part main body. The holder main body includes a weak portion between the at least two mount portions that has mechanical strength lower than other parts of the holder main body.

19 Claims, 11 Drawing Sheets

VEHICULAR INTERIOR PART

CROSS REFERENCE TO RELATED APPLICATION

This application claims priority from Japanese Patent Application No. 2013-198423 filed Sep. 25, 2013. The entire contents of the priority application are incorporated herein by reference.

FIELD OF THE INVENTION

The present disclosure relates to a vehicular interior part.

BACKGROUND OF THE INVENTION

A vehicular interior part including a light guide member has been known. The light guide member is arranged and held inside a light guide member holder (a first lens). Such a light guide member holder has a U-shaped cross section such that one side is open and the light guide member is arranged inside the U-shaped portion.

SUMMARY OF THE INVENTION

An objective of the present technology is to improve a shock absorbing property of a vehicular interior part including a light guide member holder in case of vehicle's side impact.

According to the present technology, a vehicular interior part that is a side part of a vehicle in a vehicular width direction includes an interior part main body that is a part of a vehicular interior side surface, an elongated light guide member that guides light from a light source, and a light guide member holder mounted to the interior part main body and that holds the light guide member. The light guide member holder includes an elongated holder main body including a holder recess where the light guide member is arranged and having a U-shaped cross section and extending in an elongated direction of the light guide member, and at least two mount portions provided on a peripheral end portion of the holder main body and arranged along an elongated direction of the holder main body and mounted to the interior part main body. The holder main body includes a weak portion between the at least two mount portions and the weak portion has mechanical strength lower than other parts of the holder main body.

DETAILED DESCRIPTION OF EMBODIMENTS

The light guide member holder has a U-shaped cross section and this relatively increases mechanical strength of the light guide member holder. This may lower a shock absorbing property of the light guide member holder in case of vehicle's side impact. Therefore, to improve the shock absorbing property of the light guide member holder in case of the vehicle's side impact, it is effective that the light guide member holder is likely to be deformed in case of the vehicle's side impact.

<First Embodiment>

A first embodiment of the present technology will be described with reference to FIGS. 1 to 10. In this embodiment, a vehicular door trim 10 is described as an example of a vehicular interior part. The door trim 10 is mounted to a door inner panel (not illustrated) included in a door panel to constitute a part of vehicular door (a side part of a vehicle in a vehicular width direction).

Figure 1:
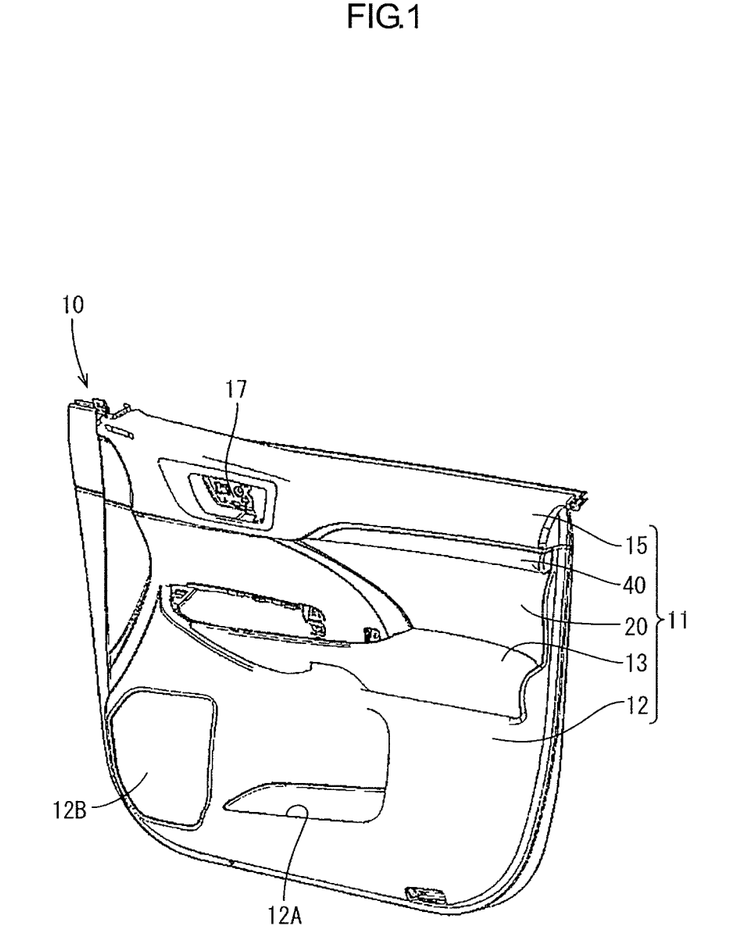
FIG. 1 is a perspective view illustrating a vehicular door trim according to a first embodiment of the present technology.

As illustrated in FIG. 1, the door trim 10 includes a trim main body 11 (an interior part main body) having a plate shape. As illustrated in FIG. 1, the trim main body 11 includes a lower board 12, an armrest 13, an ornament 20, a decoration panel 40, and an upper board 15. The trim main body 11 constitutes a vehicular interior side surface of the door trim 10.

Each of the lower board 12, the armrest 13, the ornament 20, the decoration panel 40, and the upper board 15 is a plate-like member that is made of a synthetic resin material such as polypropylene. A material of the members of the trim main body 11 is not necessarily a synthetic resin material but may be a mixture of a plant fiber and a synthetic resin.

Figure 9:
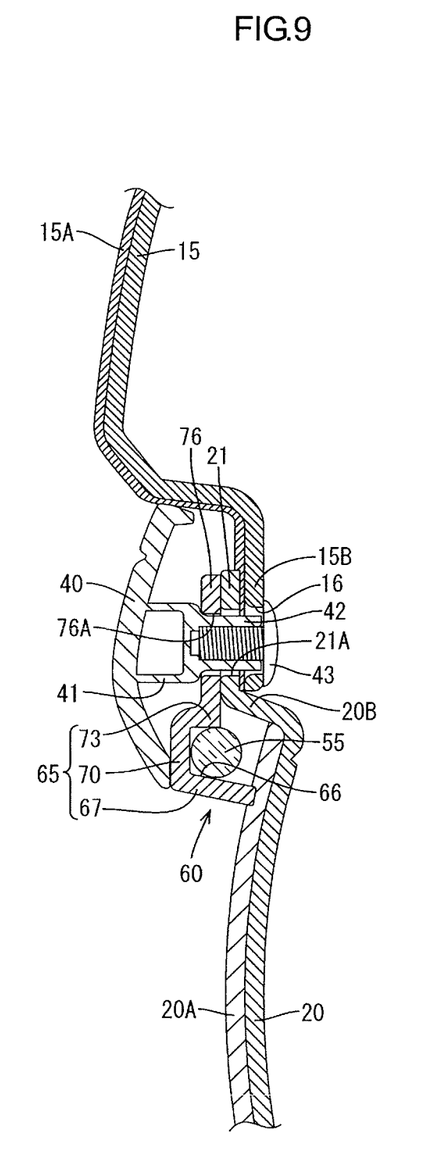
FIG. 9 is a cross-sectional view illustrating a part of the door trim in the vicinity of the light guide member holder (a light guide member holder taken along a IX-IX line in FIG. 6).

As illustrated in FIG. 9, a skin 20A is adhered to a vehicular interior-side surface of the ornament 20 and a skin 15A is adhered to a vehicular interior-side surface of the upper board 15. As illustrated in FIG. 1, the upper board 15 includes an inside handle mounting portion 17 where an inside handle (not illustrated) is mounted.

The lower board 12 is a lower part of the trim main body 11. The lower board 12 includes a door pocket opening 12A for a door pocket and a speaker grill 12B. The armrest 13 has an elongated shape extending in a vehicular front-and-rear direction and projects toward a vehicular interior side.

Figure 2:
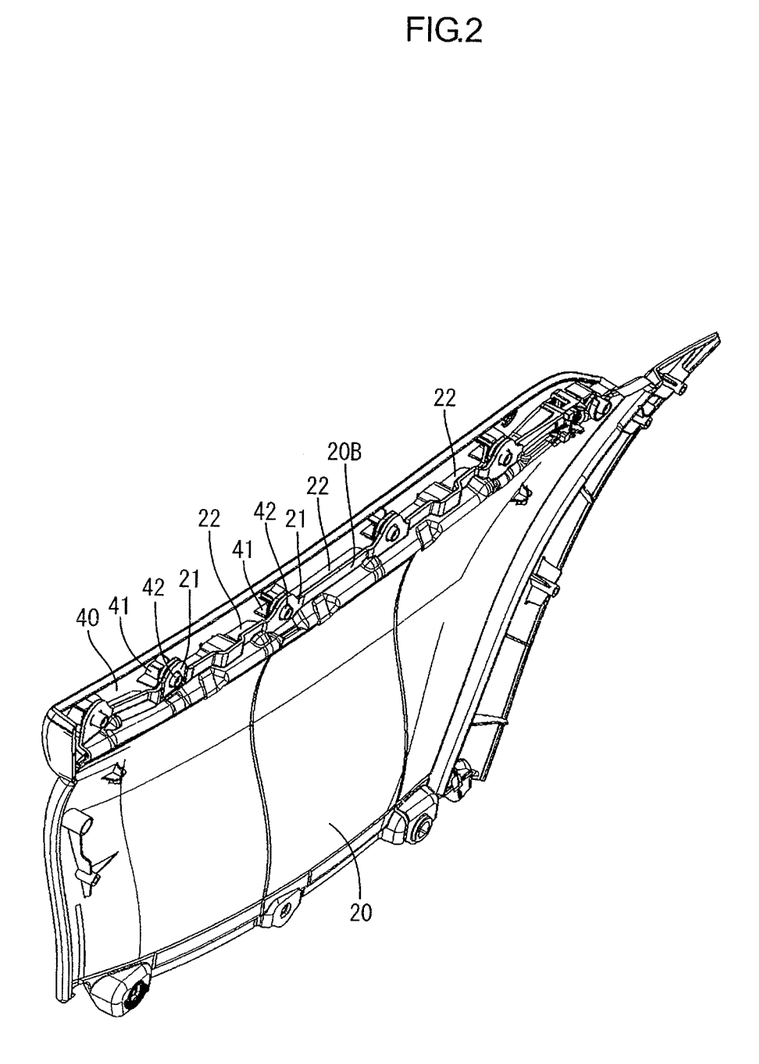
FIG. 2 is a perspective view of an ornament and a decoration panel in FIG. 1 seen from a vehicular exterior side (a rear-surface side).

The ornament 20 is arranged on an upper side with respect to the armrest 13. The ornament 20 has a substantially trapezoidal shape with a plan view. As illustrated in FIG. 9, the ornament 20 has an upper end portion 20B that forms a step such that an end of the upper end portion 20B is located at the vehicular interior side (a left side in FIG. 9) with respect to a main portion of the ornament 20. As illustrated in FIG. 2, the ornament 20 includes an ornament-side mount portion 21 at the end of the upper end portion 20B. The ornament-side mount portion 21 has a mounting hole 21A therethrough. A plurality of ornament-side mount portions 21 are provided along a vehicular front-and-rear direction.

As illustrated in FIG. 9, the upper board 15 has a lower end portion 15B that forms a step such that an end of the lower end portion 15B is located at the vehicular exterior side (a right side in FIG. 9) with respect a main portion of the upper board 15. The lower end portion 15B is arranged to cover the ornament-side mount portions 21 of the ornament 20 from the vehicular exterior side. The lower end portion 15B has a plurality of mounting holes 16.

The decoration panel 40 has an elongated shape extending in the vehicular front-and-rear direction. As illustrated in FIG. 9, a portion of the lower end portion 15B of the upper board 15 and a portion of the upper end portion 20B of the ornament 20 overlap each other, and the decoration panel 40 covers the overlapped portions from the vehicular interior side. The decoration panel 40 has a vehicular interior side surface that is a design surface such as a woodtone surface, for example. However, this is not limited thereto.

Figure 5:
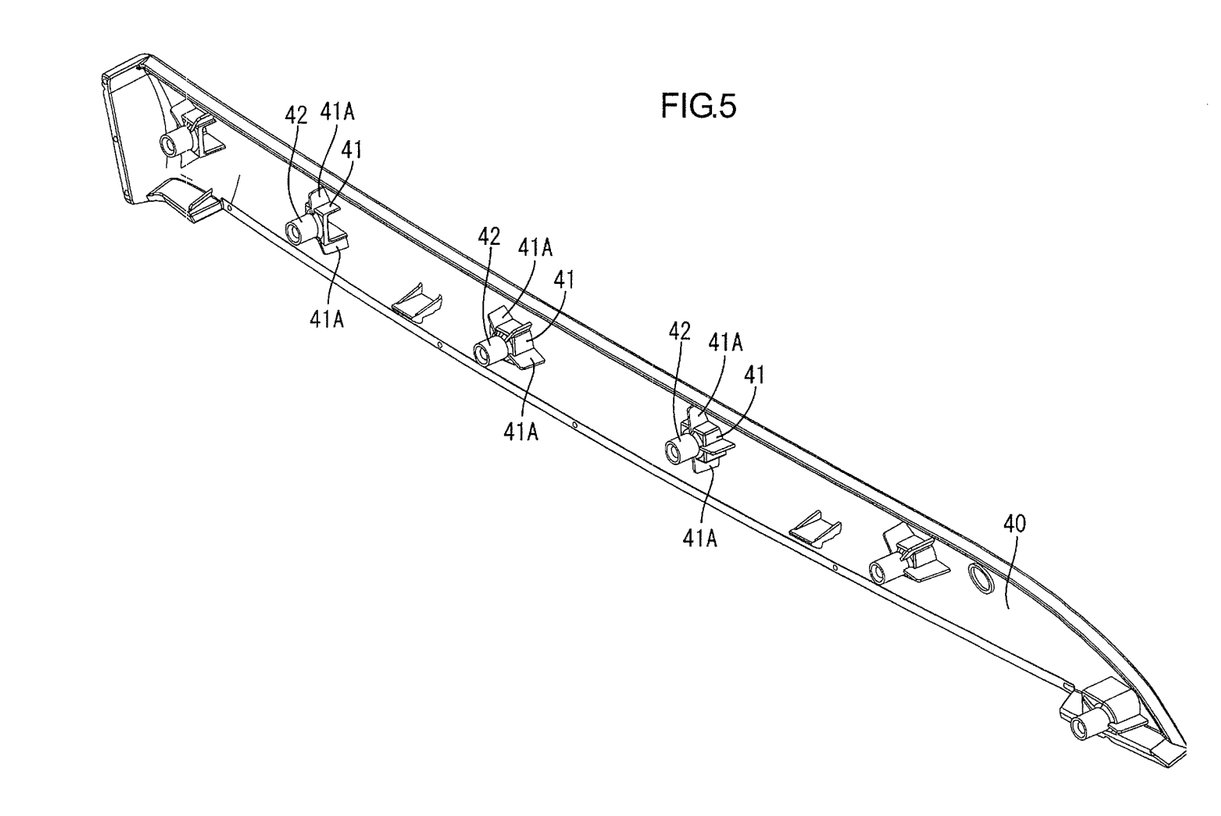
FIG. 5 is a perspective view of the decoration panel in FIG. 2 seen from the vehicular exterior side.

As illustrated in FIG. 5, the decoration panel 40 has projections such as mounting bosses 42 on its rear-side surface. Each mounting boss 42 is supported by a base seat 41. Each mounting boss 42 has a tubular shape such as a cylindrical shape and projects from a seat surface of the base seat 41 toward the vehicular exterior side.

The base seats 41 and the mounting bosses 42 are molded integrally with the decoration panel 40 by injection molding. A plate thickness of the base seat 41 is set to be smaller than a plate thickness of the mounting boss 42.

As illustrated in FIG. 5, the base seat 41 has a substantially box shape having one side being open. The opening is provided on one of side surfaces of the base seat 41 facing an elongated direction of the decoration panel 40 (for example, a vehicular front side). Such an opening is formed when the base seat 41 is molded with injection molding by using a sliding die (not illustrated).

As illustrated in FIG. 9, the mounting boss 42 is inserted through a mounting hole 76A formed in a light guide member holder 60 (that will be described later), the mounting hole 21A of the ornament 20, and the mounting hole 16 of the upper board 15 from the vehicular interior side.

After the mounting boss 42 is inserted through the mounting hole 76A, the mounting hole 21A, and the mounting hole 16 sequentially in this order, the mounting boss 42 is fixed to the lower end portion 15B of the upper board 15 by a screw 43. The fixing method of the mounting boss 42 and the lower end portion 15B is not necessarily limited to the screw but may be thermal caulking.

As illustrated in FIG. 5, each base seat 41 has ribs 41A that are provided radially around the mounting boss 42. The ribs 41A are in contact with a holder-side mount portion 76 of the light guide member holder 60 that will be described later. Accordingly, the ribs 41A restrict the holder-side mount portion 76 from moving toward the vehicular interior side.

Figure 7:
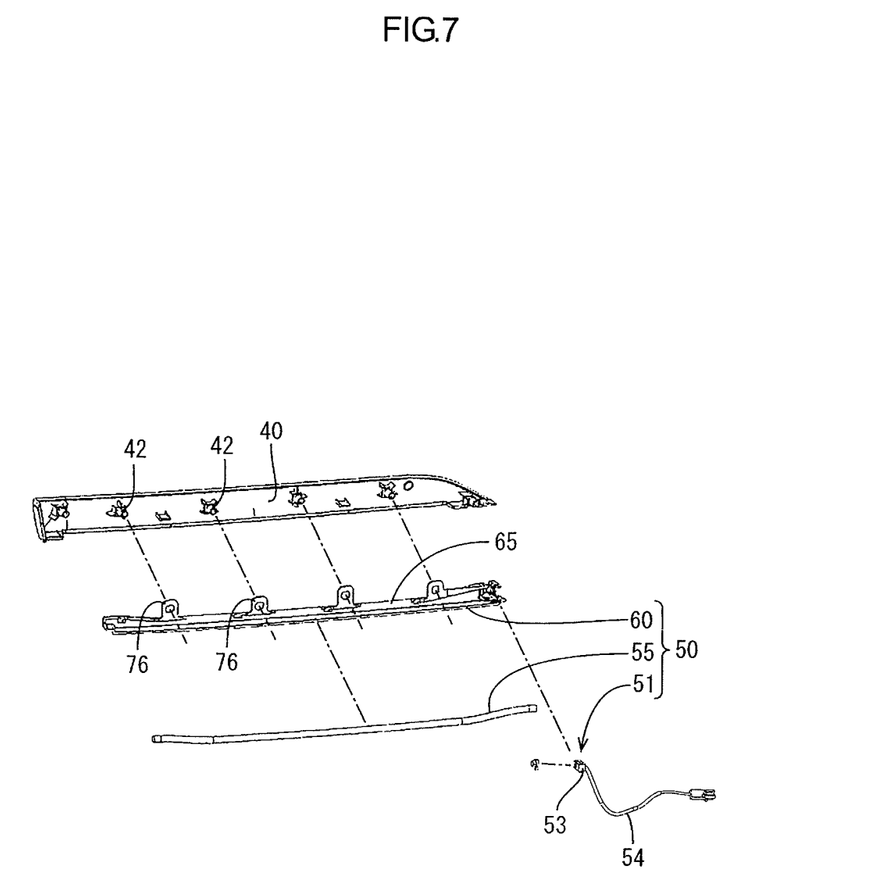
FIG. 7 is an exploded perspective view illustrating a lighting device.

The door trim 10 according to the present embodiment includes a lighting device 50. The lighting device 50 is provided on the vehicular exterior side with respect to the decoration panel 40. As illustrated in FIG. 7, the lighting device 50 includes a light source unit 51, a light guide member 55, and the light guide member holder 60.

Figure 8:
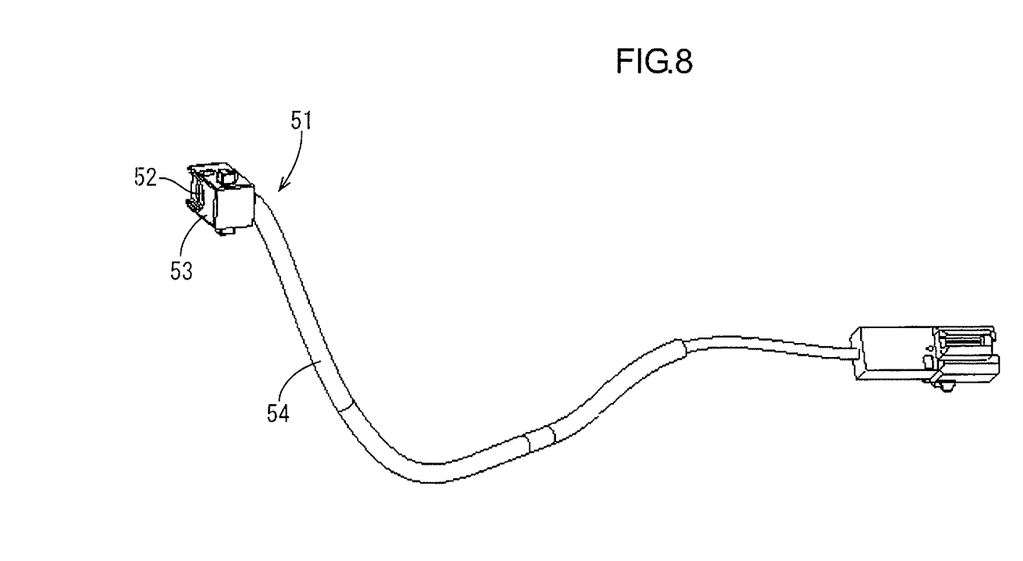
FIG. 8 is a perspective view illustrating a light source unit.

As illustrated in FIG. 8, the light source unit 51 includes an LED 52, an LED container 53 where the LED 52 is arranged, and a wire harness 54 via which the LED 52 is supplied with power.

The light guide member 55 has an elongated shape extending in the vehicular front-and-rear direction. The light guide member 55 is made of a light guide material having flexibility.

The light guide material is a material that transmits light therethrough such as acrylic resin and configured to guide light therethrough.

An outer peripheral surface of the light guide member 55 is coated with a fluorinated resin so that the light entering inside of the light guide member 55 is likely to exit outside. The configuration of the light guide member 55 is not necessarily limited thereto and may be modified if necessary.

Figure 6:
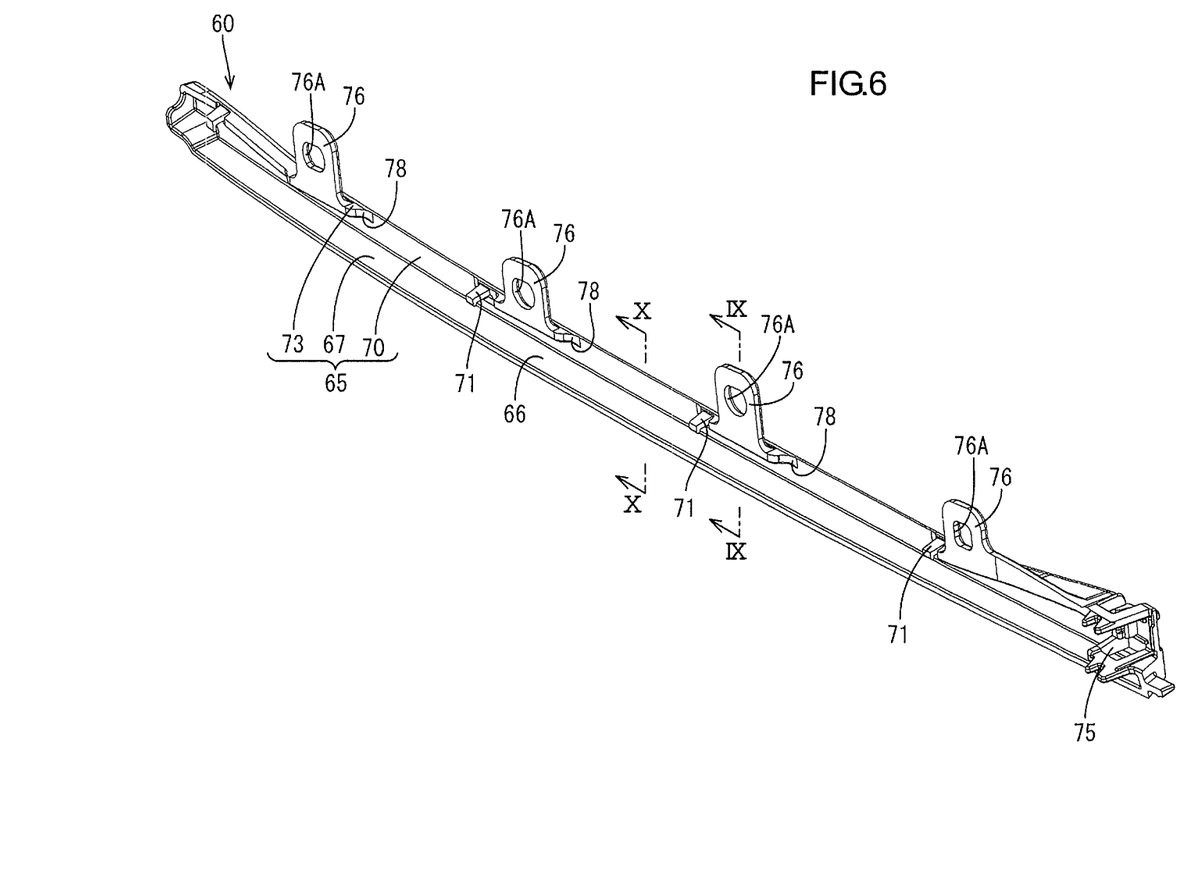
FIG. 6 is a perspective view of the light guide member seen from the vehicular exterior side.

The light guide member holder 60 holds the light guide member 55 with respect to the decoration panel 40. For example, the light guide member holder 60 is mounted to the decoration panel 40 from the vehicular exterior side. As illustrated in FIG. 6, the light guide member holder 60 includes a holder main body 65 and the holder-side mount portion 76 that is mounted to the decoration panel 40. The light guide member holder 60 is made of a synthetic resin material (for example, acrylic or polycarbonate) being highly transmissive (highly transparent) and is molded with injection molding, for example. A material or a molding method of the light guide member holder 60 is not limited thereto.

As illustrated in FIGS. 6 and 7, the holder main body 65 has an elongated shape extending in a longitudinal direction of the light guide member 55 (the vehicular front-and-rear direction). As illustrated in FIG. 9, the holder main body 65 has a holder recess 66 that is open toward the vehicular exterior side. The light guide member 55 is arranged in the holder recess 66.

As illustrated in FIG. 9, the holder main body 65 includes a vehicular interior side wall portion 70, a lower wall portion 67, and an upper wall portion 73. The lower wall portion 67 extends from a lower end of the vehicular interior side wall portion 70, and the upper wall portion 73 extends from an upper end of the vehicular interior side wall portion 70.

The lower wall portion 67, the vehicular interior side wall portion 70, and the upper wall portion 73 form the holder recess 66 in which the light guide member 55 is arranged. The holder recess 66 is configured to receive the light guide member 55 from the vehicular exterior side.

As illustrated in FIGS. 6 and 9, the upper wall portion 73 has the holder-side mount portion 76. The holder main body 65 includes a plurality of holder-side mount portions 76 (four holder-side mount portions in this embodiment) that are arranged in a longitudinal direction of the holder main body 65. The holder main body 65 necessarily includes at least two holder-side mount portions 76 and the number of the holder-side mount portions 76 may be altered if necessary.

The holder-side mount portion 76 has the mounting hole 76A through which the mounting boss 42 is inserted. The light guide member holder 60 is mounted to the decoration panel 40 by inserting the mounting boss 42 through the mounting hole 76A.

Figure 3:
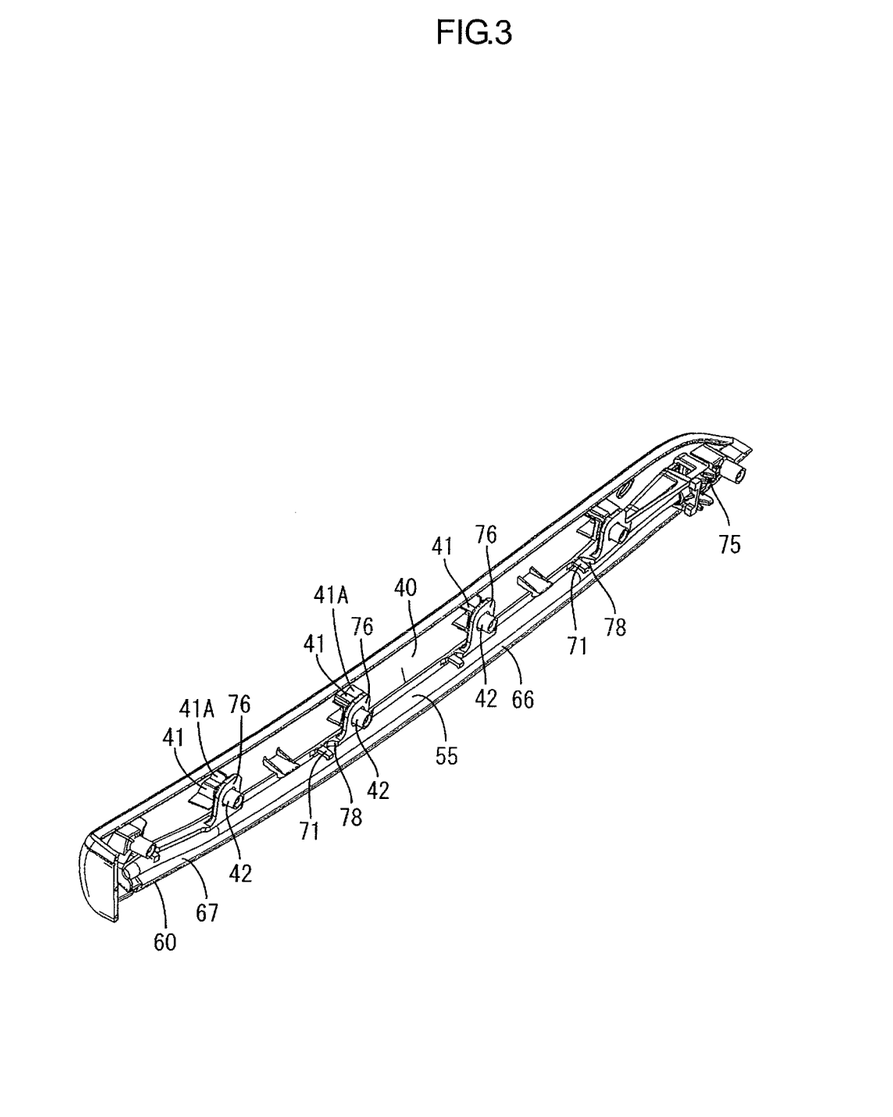
FIG. 3 is a perspective view of the decoration panel and a light guide member holder in FIG. 2 seen from the vehicular exterior side.

As illustrated in FIGS. 3, 6 and 7, stopper projections 71 are formed on a vehicular exterior side surface of the vehicular interior side wall portion 70. Each of the stopper projections 71 projects toward the vehicular exterior side and a distal end side portion is elastically deformable. As illustrated in FIG. 3, the light guide member 55 is held by the distal end portion of each stopper projection 71 so as to be held within the holder recess 66.

As illustrated in FIGS. 3 and 6, the holder main body 65 includes a fitting portion 75 to which the LED container 53 is fitted from the vehicular exterior side. A light exit surface of the LED 52 faces one end surface of the light guide member 55 in its elongated direction. With such a configuration, light emitting from the LED 52 enters the light guide member 55 through the one end surface thereof.

Figure 10:
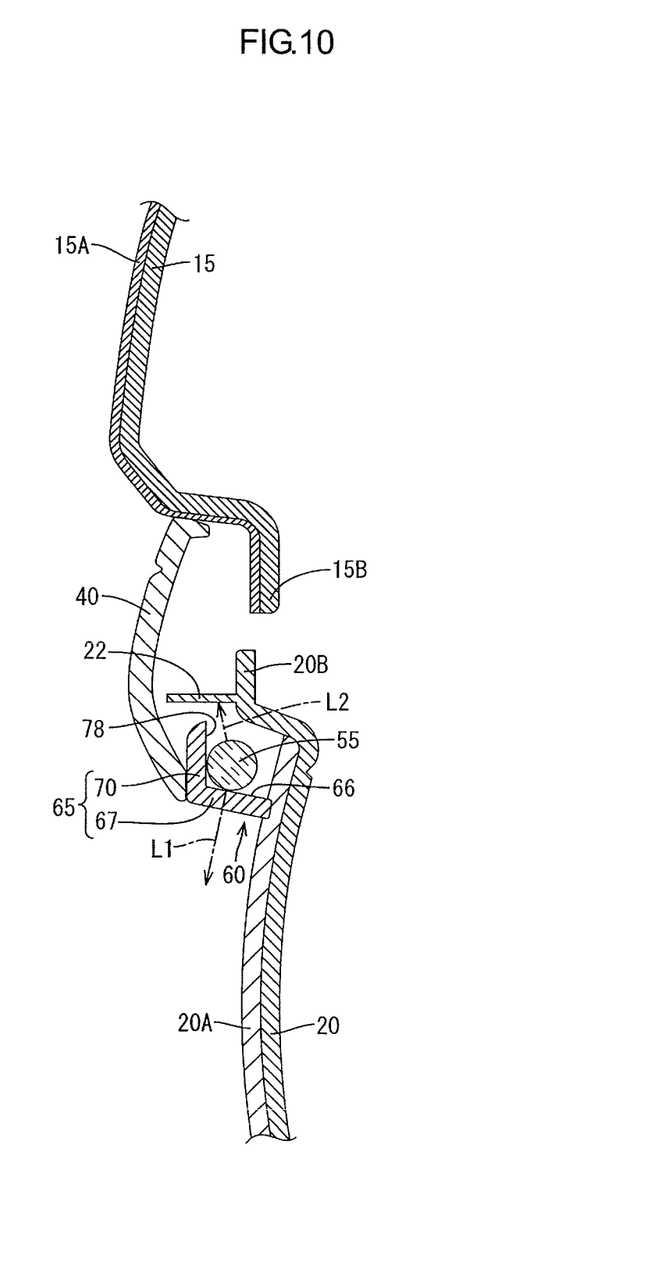
FIG. 10 is a cross-sectional view illustrating a part of the door trim in the vicinity of the light guide member holder (the light guide member holder taken along a X-X line in FIG. 6).

As illustrated in FIGS. 9 and 10, the light guide member holder 60 is arranged between the decoration panel 40 and the ornament 20. The lower wall portion 67 of the holder main body 65 is disposed to fit to and cover a space between a lower end portion of the decoration panel 40 and the upper end portion 20B of the ornament 20. With such a configuration, the light exiting from the light guide member 55 (represented by an arrow L1 in FIG. 10) transmits through the lower wall portion 67 and is directed toward the vehicular interior side.

The lower wall portion 67 faces the vehicular interior side and is a light transmissive portion through which the light exiting from the light guide member 55 transmits. A lower surface of the lower wall portion 67 constitutes a design surface of the door trim 10. The holder main body 65 may include a light blocking layer (such as a film or a coating material having a light blocking property) on a surface of a wall portion other than the lower wall portion 67.

As illustrated in FIGS. 6 and 10, the holder main body 65 includes a recess 78 where no upper wall portion 73 is formed. The recess 78 has a shape as if it were formed by cutting out a part of the upper wall portion 73. As illustrated in FIG. 6, the recess 78 (a weak portion) is formed between the adjacent holder-side mount portions 76 in the holder main body 65, and no upper wall portion 73 is formed in a portion of the holder main body 65 corresponding to the recess 78. Namely, the recess 78 is formed in a portion other than portions of the holder main body 65 where the holder-side mount portions 76 are formed.

The recess 78 extends over a substantially entire width of the upper wall portion 73 in the vehicular interior-exterior direction, and the recess 78 extends over a substantially entire distance between the adjacent holder-side mount portions 76. No upper wall portion 73 may be provided between the adjacent holder-side mount portions 76. Providing no upper wall portion between the at least two mount portions lowers mechanical strength of the holder main body as a whole and this improves the shock absorbing property of the light guide member holder.

As illustrated in FIG. 9, the holder main body 65 has a U-shaped cross section in a portion thereof where the holder-side mount portion 76 is formed (where no recess 78 is formed) and the portion of the holder main body 65 having the holder-side mount portion 76 has relatively great mechanical strength. As illustrated in FIG. 10, the holder main body 65 has an L-shaped cross section in a portion thereof where the recess 78 is formed. The lower wall portion 67 and the vehicular interior side wall portion 70 form the L shape. The portion of the holder main body 65 having the recess 78 has low mechanical strength relatively to the portion having the holder-side mount portion 76. The weak portion of the holder main body 65 has lower mechanical strength and is deformed or broken more easily than other part of the holder main body 65.

In the present embodiment, the recess 78 extends a substantially entire width of the upper wall portion 73 in the vehicular interior-exterior direction. However, it is not limited thereto. For example, the recess 78 may be formed in a part of the upper wall portion 73 in the vehicular interior-exterior direction. Further, in the present embodiment, the recess 78 extends a substantially entire distance between the adjacent holder-side mount portions 76 in the upper wall portion 73. However, it is not limited thereto. For example, the recess 78 may be formed in a part of the distance between the adjacent holder-side mount portions 76 in the upper wall portion 73.

Figure 4:
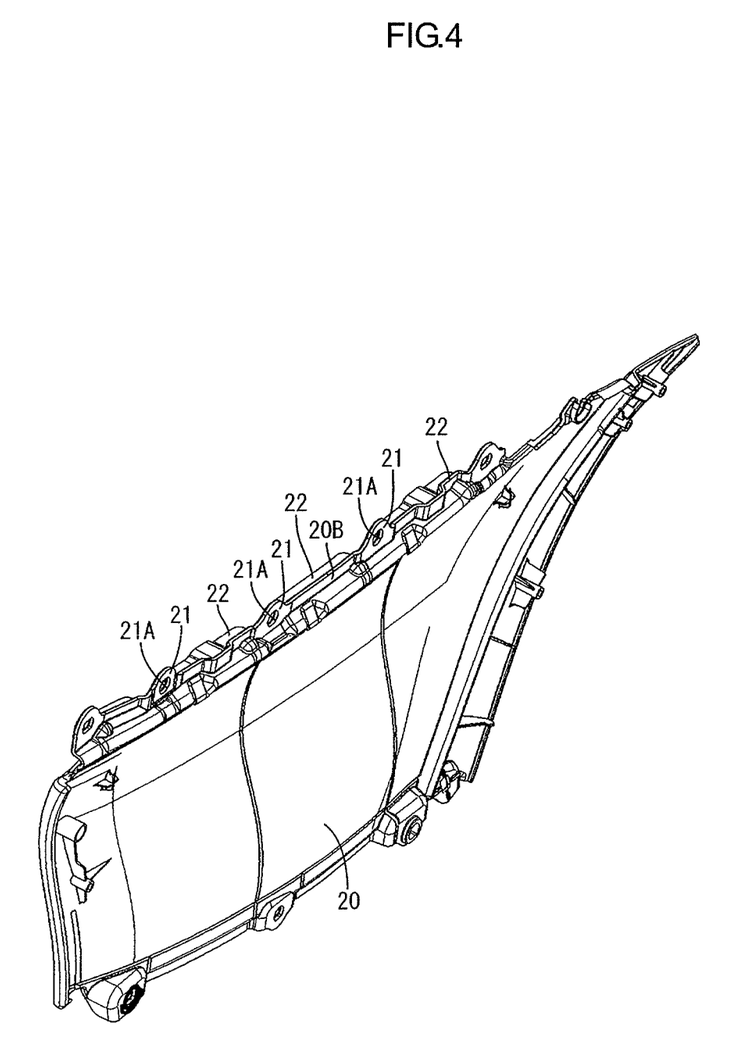
FIG. 4 is a perspective view of the ornament in FIG. 2 seen from the vehicular exterior side.

As illustrated in FIG. 10, the ornament 20 includes a projection plate 22 on its upper end portion 20B and the projection plate 22 extends from the upper end portion 20B toward the vehicular interior side. The projection plate 22 faces a space in the recess 78 and covers the space in the recess 78 and the light guide member 55 from the upper side. As illustrated in FIG. 4, the projection plate 22 extends in a vehicular front-and-rear direction and the ornament 20 has projection plates 22 corresponding to the respective recesses 78.

Next, advantageous effects of the present embodiment will be described. According to the present embodiment, the upper wall portion 73 has the recesses 78. This lowers the mechanical strength of the holder main body 65 as a whole. Therefore, the holder main body 65 is easily deformed (or broken) in the portions thereof near the recesses 78 in case of side impact, and this further improves the shock absorbing property. The recesses 78 are formed between the adjacent holder-side mount portions 76. With such a configuration, the mechanical strength of the portions of the light guide member holder 60 near the holder-side mount portions 76 is less likely to be lowered. Accordingly, the light guide member holder 60 can be surely fixed to the trim main body 11.

A material of the light guide member holder 60 may be any material as long as it has a light transmission property and may be polycarbonate having great rigidity. This increases rigidity of the holder-side mount portions 76 and the light guide member holder 60 is further firmly fixed to the decoration panel 40.

If the light guide member holder 60 without having the recesses 78 is made of polycarbonate having great rigidity, the light guide member holder 60 is less likely to be deformed in case of side impact. According to the present embodiment, the light guide member holder 60 has the recesses 78 in the upper wall portion 73, and this allows the holder main body 65 to be easily deformed.

The holder main body 65 includes the lower wall portion 67 (a light transmissive portion) that directly faces the vehicular interior side and through which the light from the light guide member 55 transmits. The holder main body 65 has the recesses 78 in the upper wall portion 73 (portions other than the light transmissive portion).

If a recess is formed in the lower wall portion 67, the recess may influence light transmitting through the lower wall portion 67 and this may cause unevenness in the light exiting from the lower wall portion 67.

Specifically, if the recess is formed in the lower wall portion 67 of the holder main body 65, an inner surface of the recess contacts air and is a border portion between the recess and air. The refractive index of light changes at the border portion. Therefore, light exiting from the portion of the holder main body 65 having the recess has a different condition from light exiting from the portion thereof without having the recess. This may cause unevenness in the light exiting from the lower wall portion 67.

According to the present embodiment, the recesses 78 are formed in the upper wall portion 73 that is the portion of the holder main body 65 other than the lower wall portion 67 and therefore, unevenness is less likely to be caused in the light exiting from the lower wall portion 67 (light exiting from the light guide member and transmits through the lower wall portion 67).

The recess 78 may be formed in the vehicular interior side wall portion 70. In such a case, a hole is formed as the recess 78 in the vehicular interior side wall portion 70 that is adjacent to the lower wall portion 67. If the hole is formed in the vehicular interior side wall portion 70, an inner hole edge surface of the hole (a border portion between air and the holder main body 65) is located near the vehicular interior side portion of the lower wall portion 67. The hole formed in the vehicular interior side wall portion 70 may influence the light exiting from the lower wall portion 67 toward the vehicular interior side (may cause unevenness in the light). However, such a configuration allows the holder main body 65 to be deformed (or broken) easily and improves a shock absorbing property. The recess 78 formed in the upper wall portion 73 that is farther from the lower wall portion 67 is less likely to influence the light exiting from the lower wall portion 67.

According to the present embodiment, the recesses 78 are formed in the upper wall portion 73 of the holder main body 65. Each of the recesses 78 has a shape as if it were formed by cutting out a part of the upper wall portion 73. The trim main body 11 has the projection plates 22 projecting to cover the respective recesses 78 from the outer side of the holder main body 65.

Openings such as the recesses 78 or the holes formed in the holder main body 65 easily lower the mechanical strength of the holder main body 65 as a whole. However, the light from the light guide member 55 may exit outside the holder main body 65 through the recesses 78 or the holes. The light exiting outside the holder main body 65 may leak toward the vehicular interior side through a clearance between the decoration panel 40 and the upper board 15.

According to the present embodiment, the projection plates 22 covering the respective recesses 78 block the light exiting from the light guide member 55 and passes through the space in the recesses 78 (represented by an arrow L2 in FIG. 10). Accordingly, the light exiting from the light guide member 55 is less likely to leak toward the vehicular interior side through the space in the recesses 78.

According to the present embodiment, the holder recess 66 of the holder main body 65 opens toward the vehicular exterior side. The holder recess 66 may not necessarily open toward the vehicular exterior side but may open upwardly.

The light guide member holder 60 may be molded by a molding die with injection molding. In such a case, if a direction in which the mounting hole 76A penetrates through the holder-side mount portion 76 matches a direction in which the holder recess 66 opens, the molding die can be removed easily. Therefore, according to the present embodiment, because the mounting hole 76A penetrates through the holder-side mount portion 76 in the vehicular interior-exterior direction, the holder recess 66 preferably opens toward the vehicular exterior side.

<Second Embodiment>

Next, a second embodiment according to the present technology will be described with reference to FIG. 11. Same parts as those in the first embodiment are provided with same symbols or numerals and will not be described. According to the second embodiment, the weak portion has a configuration different from that of the first embodiment.

Figure 11:
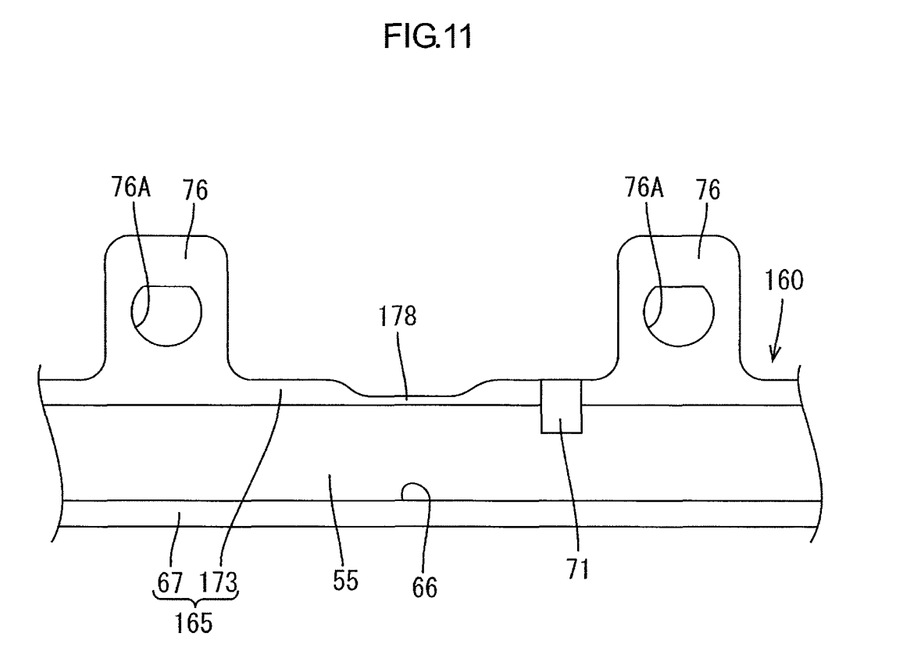
FIG. 11 is a plan view illustrating a light guide member holder according to a second embodiment of the present technology.

FIG. 11 illustrates a light guide member holder 160 according to the second embodiment seen from the vehicular exterior side. As illustrated in FIG. 11, the light guide member holder 160 according to the second embodiment has a thin portion 178 (the weak portion) in an upper wall portion 173. The thin portion 178 has a smaller thickness than other portions of the upper wall portion 173. The thin portions 178 formed in the upper wall portion 173 lower the mechanical strength of a holder member main body 165 as a whole and allow the light guide member holder 160 to be easily deformed in case of vehicle's side impact. In FIG. 11, the thin portion 178 is formed in a part of an area between the adjacent holder-side mount portions 76. However, the thin portion 178 may extend over substantially entire area between the two adjacent holder-side mount portions 76.

<Third Embodiment>

Next, a third embodiment according to the present technology will be described with reference to FIG. 12. Same parts as those in the first embodiment are provided with same symbols or numerals and will not be described. According to the third embodiment, the weak portion has a configuration different from those of the above embodiments.

Figure 12:
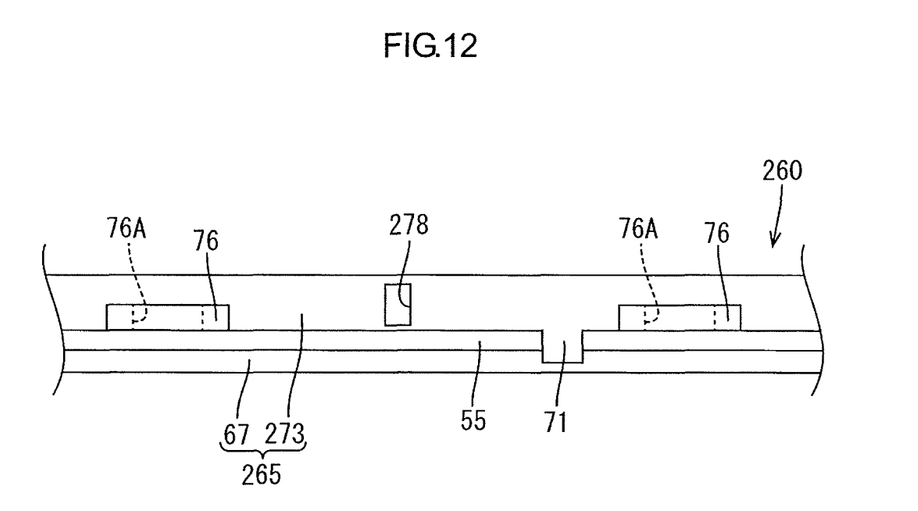
FIG. 12 is a plan view illustrating a light guide member holder according to a third embodiment of the present technology.

FIG. 12 illustrates a light guide member holder 260 according to the third embodiment seen from the above. As illustrated in FIG. 12, the light guide member holder 260 according to the third embodiment includes an upper wall portion 273 extending over a substantially entire length of the light guide member holder 260. The upper wall portion 273 includes slits 278 between adjacent holder-side mount portions 76. The slits 278 penetrate through the upper wall portion 273. The slits 278 (the weak portions) formed in the upper wall portion 273 lower the mechanical strength of a holder main body 265 as a whole and allow the light guide member holder 260 to be easily deformed in case of vehicle's side impact. In FIG. 12, the slit 278 is formed in a part of an area between the adjacent two holder-side mount portions 76. However, the slit may extend over substantially entire area between the adjacent two holder-side mount portions 76. In the present embodiment, similar to the first embodiment, the ornament 20 includes the projection portions 22 corresponding to the slits 278.

<Other Embodiments>

The present technology is not limited to the description as described above with reference to the drawings. For example, the present technology may include following embodiments.

(1) In the above embodiments, the door trim 10 is described as an example of the vehicular interior part. However, it is not limited thereto. Any interior part that constitutes a side portion of a vehicle with respect to a vehicular width direction may be used as the vehicular interior part, and for example, a pillar garnish or quarter trim may be used as the vehicular interior part.

(2) The weak portion may not necessarily limited to the recess 78 including the hole, the thin portion 178, or the slit 278. The weak portion may have any configuration as long as it can lower mechanical strength of the holder main body as a whole.

(3) In the above embodiments, among the parts included in the trim main body 11, the light guide member holder 60 is attached to the decoration panel 40. However, it is not limited thereto. The light guide member holder may be mounted to any one of the parts included in the trim main body 11. For example, the light guide member holder may be mounted to the ornament 20 or the upper board 15. The light guide member holder 60 may be mounted to the trim main body 11 from the vehicular interior side.

(4) In the above embodiments, the trim main body 11 includes a plurality of panel members (the lower board 12, the armrest 13, the ornament 20, the decoration panel 40, the upper board 15). The trim main body 11 may not necessarily have the above configuration but may have an altered configuration. For example, the trim main body 11 may include only one panel member.

(5) In the above embodiments, the projection plate 22 is formed on the upper end portion 20B of the ornament 20. However, it is not limited thereto. The projection plate 22 may be formed on a vehicular exterior side surface of the decoration panel 40. However, the base seat 41 is formed on the vehicular exterior side surface of the decoration panel 40. Therefore, a space for removing a sliding die in molding the base seat 41 with injection molding is necessarily kept on the vehicular exterior side surface of the decoration panel 40. If the projection plate 22 is formed on the vehicular exterior side surface of the decoration panel 40, it is difficult to keep a space for removing the sliding die. Therefore, the projection plate 22 may be preferably formed on the ornament 20.

The weak portion is constituted by forming an opening in one of walls of the light guide member holder or decreasing a thickness of a part of one of the walls of the light guide member holder than other parts of the one wall.

The invention claimed is:

1. A vehicular interior part that is a side part of a vehicle in a vehicular width direction, the vehicular interior part comprising:
   an interior part main body that is a part of a vehicular interior side surface;
   an elongated light guide member that guides light from a light source; and
   a light guide member holder mounted to the interior part main body and that holds the light guide member, the light guide member holder including:
      an elongated holder main body including a holder recess where the light guide member is arranged and having an upper wall, a side wall, and a lower wall forming a U-shaped cross section and extending in an elongated direction of the light guide member; and
      at least two mount portions provided on a peripheral end portion of the holder main body and arranged along an elongated direction of the holder main body and mounted to the interior part main body, wherein
   the holder main body includes a weak portion on the upper wall between the at least two mount portions, the weak portion having mechanical strength lower than other parts of the holder main body.

2. The vehicular interior part according to claim 1, wherein
   the holder main body includes a light transmissve portion that faces a vehicular interior side and through which light from the light guide member passes, and
   the holder main body includes the weak portion in its portion other than the light transmissive portion.

3. The vehicular interior part according to claim 1, wherein
   the weak portion includes a recess formed in the upper wall portion included in the holder main body, and
   the interior part main body includes a projection portion that projects from the interior part main body to cover a space within the recess from an outer side with respect to the holder main body.

4. The vehicular interior part according to claim 1, wherein
   the weak portion includes a slit formed in the upper wall portion included in the holder main body, and
   the interior part main body includes a projection portion that projects from the interior part main body to cover the slit from an outer side with respect to the holder main body.

5. The vehicular interior part according to claim 1, wherein
   the weak portion is a thin portion included in a part of the upper wall portion of the holder main body and the thin portion has a thickness smaller than other portion of the wall portion.

6. The vehicular interior part according to claim 1, wherein
   the holder recess having the U-shaped cross section includes the side wall between the upper wall and the lower wall, and
   the weak portion includes an opening formed in the upper wall portion.

7. The vehicular interior part according to claim 6, wherein
   the interior part main body includes a projection portion that projects from the interior part main body to cover the opening from an outer side with respect to the holder main body.

8. The vehicular interior part according to claim 2, wherein
   the holder recess having the U-shaped cross section includes the side wall between the upper wall and the lower wall, and
   the lower wall includes the light transmissive portion.

9. The vehicular interior part according to claim 8, wherein
   the at least two mount portions are provided on the peripheral end portion of the upper wall.

10. The vehicular interior part according to claim 9, wherein
    the weak portion includes an opening.

11. The vehicular interior part according to claim 9, wherein
    between the at least two mount portions the holder recess includes only the side wall and the lower wall.

12. The vehicular interior part according to claim 10, wherein
    the interior part main body includes a projection portion that projects from the interior part main body to cover the opening from an outer side with respect to the holder main body.

13. A vehicular interior part that is a side part of a vehicle in a vehicular width direction, the vehicular interior part comprising:
    an interior part main body that is a part of a vehicular interior side surface;
    an elongated light guide member that guides light from a light source; and
    a light guide member holder mounted to the interior part main body and that holds the light guide member, the light guide member holder including:
       an elongated holder main body including a holder recess where the light guide member is arranged and having a U-shaped cross section and extending in an elongated direction of the light guide member; and
       at least two mount portions provided on a peripheral end portion of the holder main body and arranged along an elongated direction of the holder main body and mounted to the interior part main body, wherein
    the holder main body includes a weak portion between the at least two mount portions, the weak portion having mechanical strength lower than other parts of the holder main body,
    the weak portion includes a recess formed in a wall portion included in the holder main body, and
    the interior part main body includes a projection portion that projects from the interior part main body to cover a space within the recess from an outer side with respect to the holder main body.

14. A vehicular interior part that is a side part of a vehicle in a vehicular width direction, the vehicular interior part comprising:
    an interior part main body that is a part of a vehicular interior side surface;
    an elongated light guide member that guides light from a light source; and
    a light guide member holder mounted to the interior part main body and that holds the light guide member, the light guide member holder including:
       an elongated holder main body including a holder recess where the light guide member is arranged and having a U-shaped cross section and extending in an elongated direction of the light guide member; and at least two mount portions provided on a peripheral end portion of the holder main body and arranged along an elongated direction of the holder main body and mounted to the interior part main body, wherein the holder main body includes a weak portion between the at least two mount portions, the weak portion having mechanical strength lower than other parts of the holder main body, the weak portion includes a slit formed in a wall portion included in the holder main body, and the interior part main body includes a projection portion that projects from the interior part main body to cover the slit from an outer side with respect to the holder main body.

15. A vehicular interior part that is a side part of a vehicle in a vehicular width direction, the vehicular interior part comprising:

an interior part main body that is a part of a vehicular interior side surface;

an elongated light guide member that guides light from a light source; and a light guide member holder mounted to the interior part main body and that holds the light guide member, the light guide member holder including:

an elongated holder main body including a holder recess where the light guide member is arranged and having a U-shaped cross section and extending in an elongated direction of the light guide member; and at least two mount portions provided on a peripheral end portion of the holder main body and arranged along an elongated direction of the holder main body and mounted to the interior part main body, wherein the holder main body includes a weak portion between the at least two mount portions, the weak portion having mechanical strength lower than other parts of the holder main body, the holder main body includes a light transmissve portion that faces a vehicular interior side and through which light from the light guide member passes, and the holder main body includes the weak portion in its portion other than the light transmissive portion, the holder recess having the U-shaped cross section includes an upper wall portion, a lower wall portion, and a side wall portion between the upper wall portion and the lower wall portion, and the lower wall portion includes the light transmissive portion and the upper wall portion includes the weak portion, wherein the at least two mount portions are provided on the peripheral end portion of the upper wall portion, and wherein the weak portion includes an opening.

16. The vehicular interior part according to claim 15, wherein the interior part main body includes a projection portion that projects from the interior part main body to cover the opening from an outer side with respect to the holder main body.

17. The vehicular interior part according to claim 1, wherein the upper wall is opposite the lower wall.

18. The vehicular interior part according to claim 1, wherein the weak portion includes an opening, the opening extending from a first one of the at least two mount portions to a second one of the at least two mount portions.

19. The vehicular part according to claim 17, wherein the weak portion includes an opening, the opening extending from a first one of the at least two mount portions to a second one of the at least two mount portions.

* * * * *